United States Patent [19]
Verbakel

[11] 3,983,601
[45] Oct. 5, 1976

[54] APPARATUS FOR REMOVING ENTRAILS OF SLAUGHTERED POULTRY

[75] Inventor: Godefridus Hendrikus Waltherus Verbakel, Helmond, Netherlands

[73] Assignee: Stork Brabant B.V., Boxmeer, Netherlands

[22] Filed: Aug. 7, 1974

[21] Appl. No.: 495,512

[30] Foreign Application Priority Data
Aug. 7, 1973 Netherlands.................... 7310913

[52] U.S. Cl. .................................................. 17/11
[51] Int. Cl.² ........................................... A22C 21/06
[58] Field of Search............................. 17/11, 52, 45

[56] References Cited
UNITED STATES PATENTS
1,986,195 1/1935 Griffin .................................. 17/11
3,555,593 1/1971 Scheier ................................. 17/11

Primary Examiner—Robert Peshock
Attorney, Agent, or Firm—Edmund M. Jaskiewicz

[57] ABSTRACT

Device for removing the entrails of slaughtered poultry with a spoon-shaped member disposed at the end of a carrier, swingable around a shaft extending perpendicular to the longitudinal plane thereof and coupled to an operating member, said carrier having a fixed part adjoining the spoon-shaped member to be introduced together therewith into the bird, with the front edge of the fixed part being situated before the pivot axis of the spoon-shaped member.

4 Claims, 6 Drawing Figures

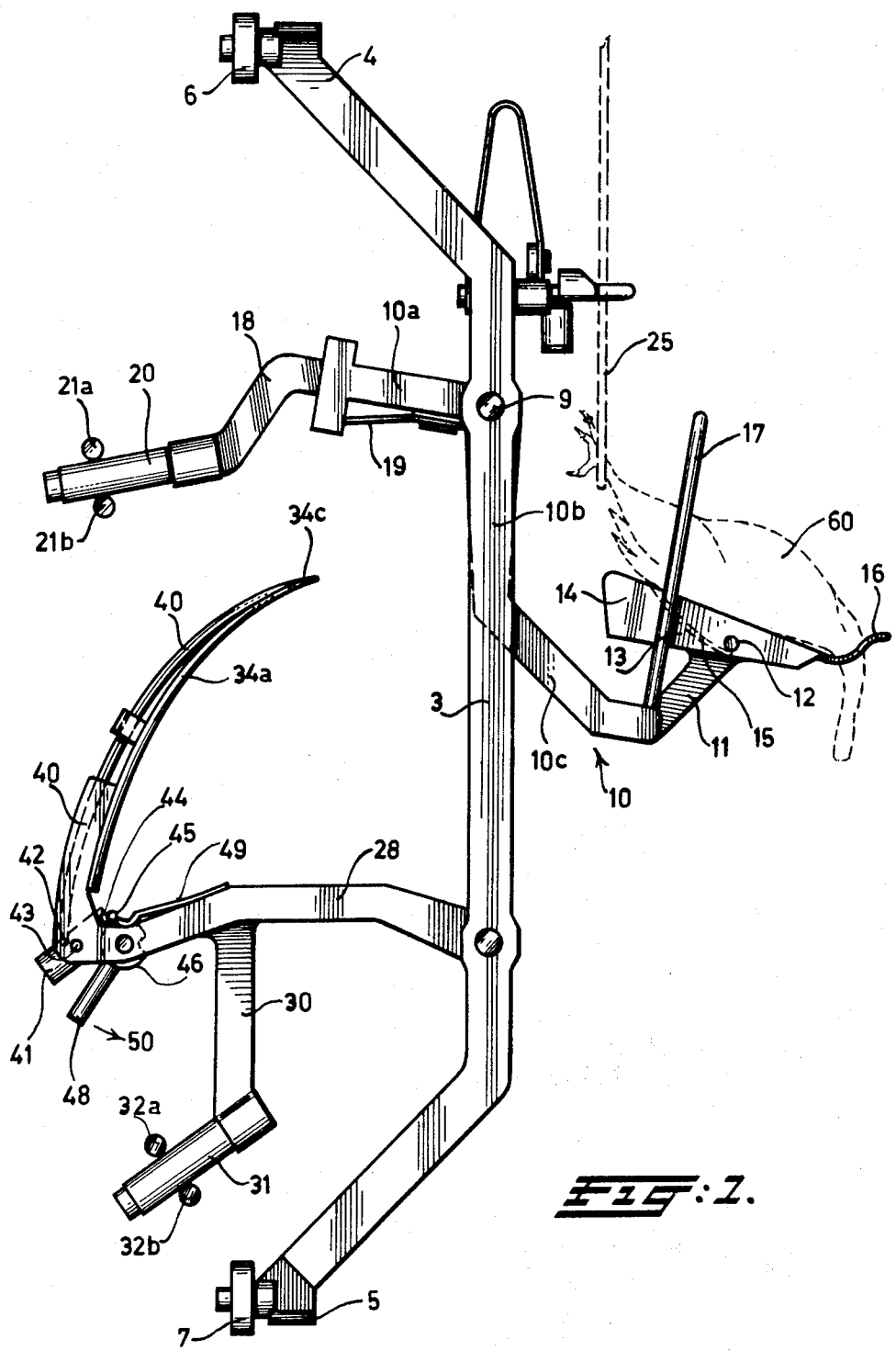

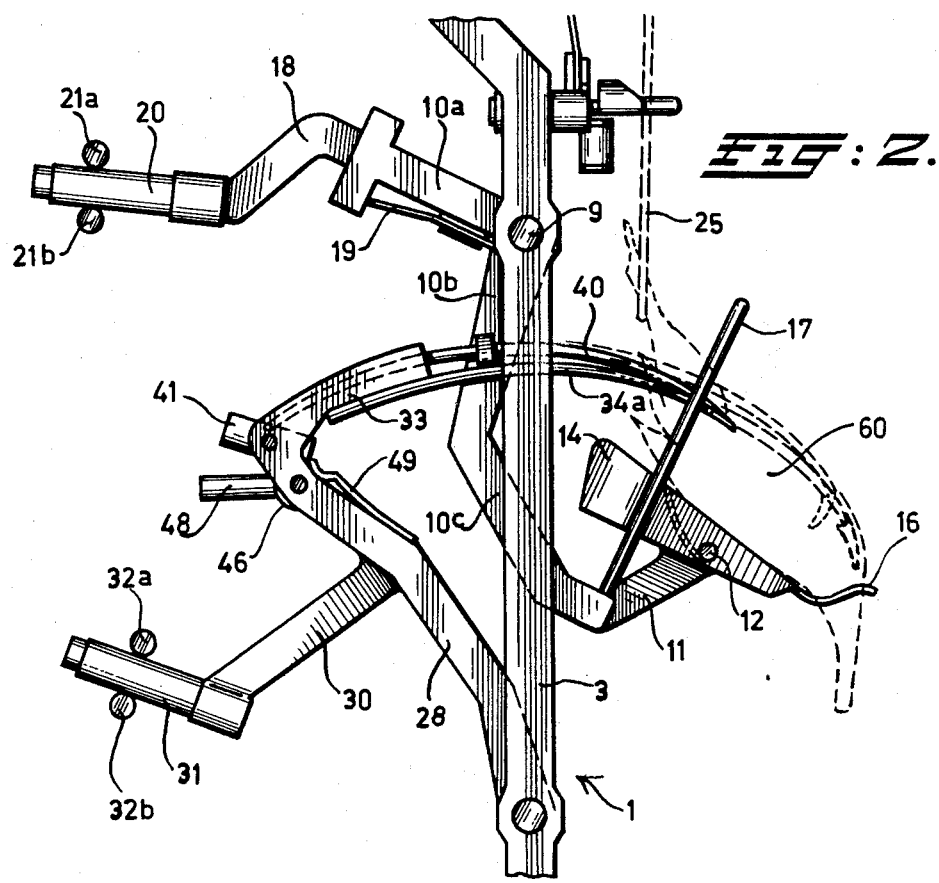

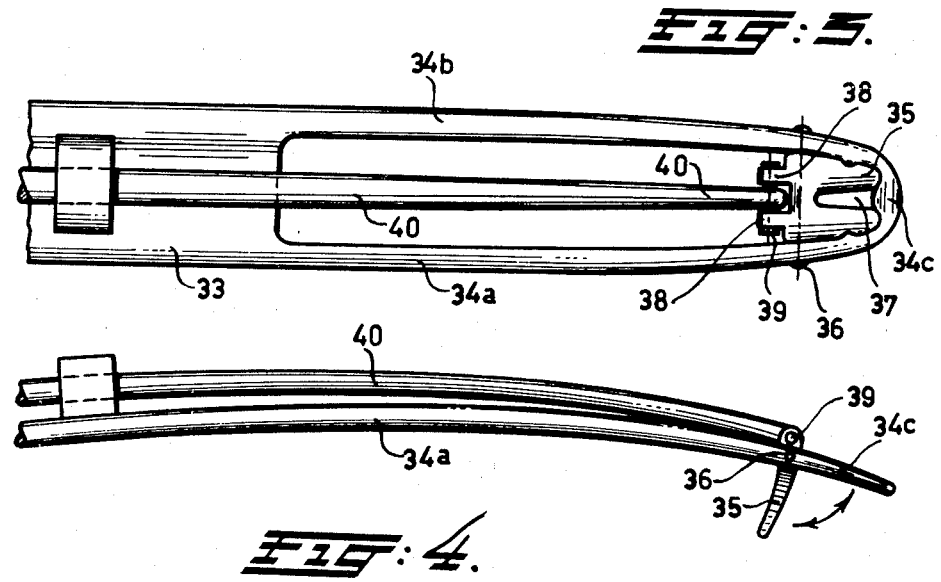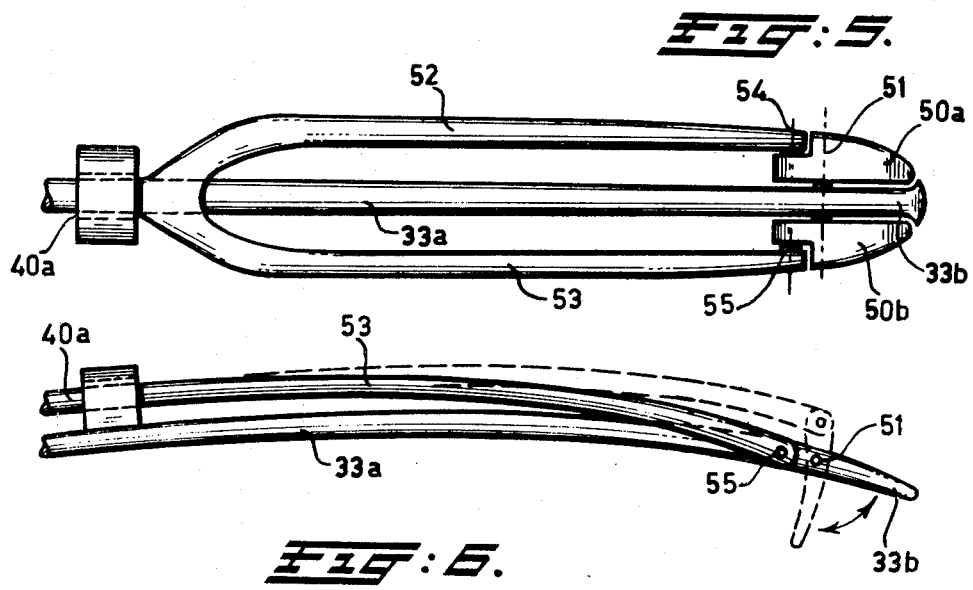

APPARATUS FOR REMOVING ENTRAILS OF SLAUGHTERED POULTRY

BACKGROUND OF THE INVENTION

My invention relates to a method and device for removing the inner parts of slaughtered poultry, the device comprising a spoon-shaped member disposed at the end of a carrier, coupled to an operating member and swingable around a shaft extending perpendicular to the longitudinal plane thereof.

Such a device is known, and subject of the Dutch Patent application No. 7205388, laid out for public inspection. This known device uses two cooperating members for removing the entrails, which both describe a curved path into the bird and consist of a spatula and a spoon-shaped member movable along a path extending over the spatula. On describing its path in the poultry the spatula severs the entrails from the breast-bone so that at the subsequent backward movement of the spoon-shaped member, swung around its axis of rotation and being almost perpendicular to the longitunal axis of the carrier, these organs can be easily taken along by this member.

Owing to the use of these two parts additional control members are required so that the whole is more complicated, but the use of the spoon-shaped member, only in the shape as used in the aforementioned device, gives rise to difficulties, since during the swinging movement a force is exerted on the bird whereby the bird hanging by its feet is lifted so that the spoon-shaped part cannot possibly be engaged in the correct way behind the intestines to pull them loose.

SUMMARY OF THE INVENTION

My invention aims to construct the aforementioned device in such a way that the spatula used therein can be omitted. This is attained by the arrangement that the carrier comprises a fixed part adjoining the spoon-shaped member and to be introduced together with the spoon-shaped member into the bird, the front edge of the fixed part being situated before the axis of pivot of the spoon-shaped member.

When the spoon-shaped member is entirely introduced into the bird until the fixed part of the member bears against the breast bone, and the entire member in this way is always fixed at the same location in the bird, then, when the spoon-shaped member swings out of position, the reaction force produced thereby will be transmitted, via the fixed part, of which the front edge lies before the axis of pivot, to the breast bone and will be taken up by the breast bone, so that the bird cannot move along in the direction of movement of this spoon-shaped member and the spoon-shaped member gets at the right location behind the intestines after it has swung out of position, so that the intestines will be completely pulled loose.

During the subsequent return movement of the spoon-shaped member the complete intestine package is removed.

The carrier preferably comprises two spaced juxtaposed oblong suspension rods which at their front end are interconnected via a rounded bridge part, enclosing the spoon-shaped member.

The device can also be constructed such that the carrier comprises two juxtaposed spaced oblong suspension rods which at their front end merge into a single central part carrying two parts of the spoon-shaped member situated on either side thereof, the rounded side edges of the parts of the spoon-shaped member adjoining the rounded front edge of the central part.

The operating member consists preferably of an operating rod which at short distance behind the axis of pivot of the spoon-shaped member is pivotally connected therewith.

SURVEY OF THE DRAWINGS

FIG. 1 is a side elevation of a unit for removing the intestines of poultry according to the invention;

FIG. 2 shows a side elevation of a part of such a unit in which is represented the path described by the spoon-shaped member;

FIG. 3 is a plan view on a larger scale of the spoon-shaped member as used in the embodiment according to FIGS. 1 and 2;

FIG. 4 is a side elevation to FIG. 3;

FIG. 5 is a plan view, to a larger scale of another embodiment of the spoon-shaped member;

FIG. 6 is a side elevation to FIG. 5.

DESCRIPTION OF PREFERRED EMBODIMENTS

The device shown in FIGS. 1 and 2 corresponds substantially with that described in the Dutch Patent application 7205388 laid out for public inspection on Apr. 21, 1972.

The Figures show a treatment unit for removing the entrails of a bird, consisting of a frame 1 constructed from two supporting beams running parallel for a part of their length, one of which is visible in the Figure and denoted by the reference numeral 3. These supporting beams are interconnected at their upper end by a connecting piece 4 and at their lower end by a connecting piece 5. The connecting piece 4 carries a guide roller 6; the connecting piece 5 carries the guide roller 7. The treatment unit, combined with a plurality of analogous treatment units to a complete apparatus, can move by means of the rollers 6 and 7 along a closed conveyor track. This conveyor track extends for a part of its length parallel to the conveyor track for the birds so that during their movement along the track the intestines of the birds can be removed.

Between beams 2 and 3 is a first centre of rotation around which can rotate a first supporting arm 10. The latter is of substantially Z-section and consists of a part 10a protruding backwards from the centre of rotation 9, a part 10b about perpendicular thereto and a part 10c making on obtuse angle with the part 10 and extending in a forward direction, while the end of the part 10c is connected with an upwardly inclined supporting piece 11. The latter carries via the pivotal point 12 the plate 13 which through a limited angle can tilt and the backside 14 of which is pressed upwards by the plate spring 15. The plate 13 which on its frontside ends in two supporting lips 16, which are upwardly bent and separated from each other by a recess, is surrounded by a channel section strap 17 which is secured to the end of the part 10c of the supporting arm. The supporting arm 10 cooperates with a bent supporting arm 18 the end of which can likewise rotate around the centre of rotation 9 and which with respect to the part 10a of the supporting arm can move through a restricted angle in opposition to the effect of a spring 19 secured to the supporting arm 10. The supporting arm 18 merges into a cylindrical control cam 20 which cooperates with two oblong control rods 21a, 21b, the arrangement being such that, when the frame 1 moves along the control rods 21a, 21b the level thereof with respect to the fixed level of the guide rails (not shown) for the rollers 6, 7 determines the level of the cylindrical supporting cam 20 and as a consequence the position of the supporting arm 18 and thus also the position of the supporting arm 10.

Under the centre of rotation 9 is a second centre of rotation 27 around which a V-shaped supporting arm 28 can rotate. The latter carries, at some distance from the centre of rotation 27, the control arm 30 with the cylindrical control cam 31 which cooperates with the bent control rods 32a, 32b analogous to the control of the control rods 21a, 21b.

The leg 33 carries two bent supporting rods 34a, 34b (see FIGS. 3 and 4) with rounded side edges which on the frontside merge into each other via a rounded part 34c. This part 34c and the ends of the parts 34a, 34b enclose a forked spoon-shaped member 35 which can turn on a shaft 36 and has a central recess 37. The lips 38 are pivotally connected via the shaft 38 with the driving rod 40. The latter is slidably guided in the arm 33 and the location 42 pivoted to the tumbler 41 disposed between the two parts of the arm 33; this tumbler can turn on the shaft 43 supported in the arm 33 and the longitudinally extending slot 44 therein cooperates with the cam 45 on the cylindrical control member 46 which carries a cylindrical control cam 48. The control cam 46 can be locked in two positions by means of a locking spring 49. A movement of the control cam 48 in the direction of the arrow 50 results in that the point 42 moves in the direction of the arrow 51 whereby the control rod moves forward and the spoon 35 moves from the position in which it is situated in the plane of the rods 34a, 34b (FIGS. 3, 5) to a position transverse thereto (FIGS. 4, 6).

The device operates as follows; when the intestines are being removed the bird is bearing, while its neck is turned toward the sloping up lips 16, on the plate 13. The bird hangs by its legs on the shackle 25 (see FIG. 2). The legs of the bird embrace the supporting strap 17 and via a cut previously made in the abdomen of the bird the carrier 34a, 34b together with the bridge piece 34c is introduced into the bird until the front edge of the part 34c bears against the breast bone. In FIG. 2 this position is shown in dash lines. When now the operating rod 40 is moved back in a direction opposite to the arrow 51, which is achieved by a proper operation of the control cam 48, then the spoon-shaped member 35 swings to the position shown in dash lines in FIG. 2. So the intestines in front of the spoon-shaped member are pulled loose and the reaction force produced thereby is transmitted to the breast bone by the front edge of the bent part 34c. The bird is not pushed from the support 14. During the subsequent return movement of the parts 34a, 34b with the spoon 35 which is swung out of position as shown in FIG. 4 the complete intestine package is removed from the body of the bird.

FIGS. 5 and 6 show in plan view, side elevation, respectively, another embodiment of the carrier with the spoon-shaped member, which is likewise based on the principle of the invention. The single fixed rod-shaped part 33a ends in a nose 33b and the spoon-shaped member is here divided into two parts 50a, 50b which can turn via the pivot 51 carried by the part 33b. Their outer edge is rounded and merges gradually into the front edge of the nose 33b. The operating rod 40a merges into a fork 52, 53, which via the pivots 54, 55 is coupled to the respective parts 50a, 50b of the spoon-shaped member.

FIG. 6 shows in full lines the situation on introducing the parts into the bird; the parts 35b, 50a, 50b are substantially situated in one plane. When the operating rod 40 is moved forward the parts 50a, 50b swing downwards, whereas part 33b remains in position, bears against the breastbone and absorbs the produced reaction force.

As has been stated already the frame 1 is destined to be combined with a plurality of analogous frames into a treatment machine in a way as described in the Dutch Patent application 7205388 and which for that reason will not further be illustrated. Also the operation of the various members by means of the operating cams and operating rods is effected in the way as indicated in this patent application.

It is obvious that the described way of operating the spoon-shaped member 35 or 50a, 50b is not essential. The spoon can also be swung in or out of position in another way.

What I claim is:

1. A device for removing the entrails of slaughtered poultry comprising a carrier having a fixed portion and a front edge which is introduced into the poultry, a spoon-shaped member pivotally mounted about a shaft extending perpendicularly to the longitudinal plane of said carrier and spaced inwardly of said carrier front edge, means for operating said spoon-shaped member, said spoon-shaped member positioned inwardly of said front edge such that when said carrier fixed portion and spoon-shaped member are introduced together into poultry said front edge will bear against a portion of the poultry upon operating of said spoon-shaped member to pull loose entrails within the poultry.

2. Device according to claim 1, wherein the said carrier fixed portion comprises two juxtaposed oblong suspension rods which are interconnected at their front edge via a rounded bridge part, enclosing the spoon-shaped member.

3. Device according to claim 1 wherein the carrier fixed portion comprises two juxtaposed oblong suspension rods which at their front edge merge into a single central part carrying two parts of the spoon-shaped member situated on either side thereof, the rounded side edges of the parts of the spoon-shaped member adjoining the rounded front edge of the central part.

4. Device according to claim 1 wherein said operating means an operating rod which at a short distance behind the axis of pivot of the spoon-shaped member is pivotally connected therewith.

* * * * *